US008976246B1

(12) United States Patent
Rappuhn (10) Patent No.: US 8,976,246 B1
(45) Date of Patent: Mar. 10, 2015

(54) GOOSENECK OR FIFTH WHEEL TRAILER HITCH ALIGNMENT AND SAFETY SYSTEM

(76) Inventor: Michael E. Rappuhn, Meson, MI (US)

(*) Notice: Subject to any disclaimer, the term of this patent is extended or adjusted under 35 U.S.C. 154(b) by 393 days.

(21) Appl. No.: 13/437,979

(22) Filed: Apr. 3, 2012

(51) Int. Cl.
*H04N 7/18* (2006.01)

(52) U.S. Cl.
USPC .......................................................... 348/148

(58) Field of Classification Search
USPC .......................................................... 348/148
See application file for complete search history.

(56) References Cited

U.S. PATENT DOCUMENTS

| D312,649 | S | 12/1990 | Sakuta | |
|---|---|---|---|---|
| 5,650,764 | A * | 7/1997 | McCullough | 340/431 |
| 6,765,607 | B2 * | 7/2004 | Mizusawa et al. | 348/118 |
| 7,006,127 | B2 * | 2/2006 | Mizusawa et al. | 348/118 |
| 7,171,769 | B2 * | 2/2007 | Schultz et al. | 37/231 |
| 7,195,267 | B1 | 3/2007 | Thompson | |
| 7,429,051 | B2 * | 9/2008 | Bauer et al. | 280/6.15 |
| 8,138,899 | B2 * | 3/2012 | Ghneim | 340/435 |
| 2002/0145662 | A1 * | 10/2002 | Mizusawa et al. | 348/118 |
| 2002/0167589 | A1 * | 11/2002 | Schofield et al. | 348/148 |
| 2003/0234512 | A1 | 12/2003 | Holub | |
| 2008/0180526 | A1 | 7/2008 | Trevino | |
| 2009/0040300 | A1 * | 2/2009 | Scribner | 348/143 |
| 2009/0236825 | A1 * | 9/2009 | Okuda et al. | 280/477 |
| 2009/0262192 | A1 * | 10/2009 | Schofield et al. | 348/148 |
| 2009/0271078 | A1 * | 10/2009 | Dickinson | 701/51 |
| 2010/0039515 | A1 | 2/2010 | Dietz | |
| 2011/0216199 | A1 * | 9/2011 | Trevino et al. | 348/148 |
| 2012/0229639 | A1 * | 9/2012 | Singleton | 348/148 |
| 2013/0076007 | A1 * | 3/2013 | Goode et al. | 280/504 |

* cited by examiner

*Primary Examiner* — Sath V Perungavoor
*Assistant Examiner* — Peter D Le (57) ABSTRACT

The gooseneck or fifth wheel trailer hitch alignment and safety system includes a reverse camera and at least one proximity sensor to provide alignment of a hitch to a hitch ball located inside of a truck bed. The reverse camera is positioned on or around a third brake light, and is aimed at the truck bed so as to provide visualization inside of the truck bed. The proximity sensor(s) detects the presence of a respective hitch located inside of the truck bed, and emits different colored alarms that in concert with the visualization of the reverse camera provide alignment means to a respective driver of said truck.

1 Claim, 7 Drawing Sheets

GOOSENECK OR FIFTH WHEEL TRAILER HITCH ALIGNMENT AND SAFETY SYSTEM

CROSS REFERENCES TO RELATED APPLICATIONS

Not Applicable.

STATEMENT REGARDING FEDERALLY SPONSORED RESEARCH

Not Applicable.

REFERENCE TO APPENDIX

Not Applicable.

BACKGROUND OF THE INVENTION

A. Field of the Invention

The present invention relates to the field of trailer hitch systems, more specifically, an alignment and safety system that aids an end user in aligning a gooseneck or fifth wheel styled hitch ball of a truck bed with a respective trailer.

B. Discussion of the Prior Art

As will be discussed immediately below, no prior art discloses a reverse camera system for use with a pickup truck bed that works in conjunction with a proximity sensor to provide assistance in aligning a gooseneck of fifth wheel styled hitch ball located inside of a truck bed with an applicable gooseneck or fifth wheel trailer hitch; wherein the reverse camera system is centrally positioned on a $3^{rd}$ brake light and is directed downwardly into the truck bed in order to give visual display of the truck bed; wherein the reverse camera system may work in conjunction with an existing camera system of the truck, which may include a camera located on or around the tailgate and be of use up and until the gooseneck hitch is positioned inside of the truck bed whereupon the reverse camera system is used; wherein the proximity sensor detects the location of the gooseneck hitch inside of the truck bed, and provides different colored alarms in connection with the visual display of the reverse camera system in order to provide an alignment system for the gooseneck hitch of the gooseneck trailer with respect to the gooseneck hitch ball located in the truck bed.

The Holub Patent Application Publication (U.S. Pub. No. 2003/0234512) discloses a video alignment system in which a camera is mounted on a trailer and is aimed at the hitch for the purpose of aligning the hitch and trailer together via wireless communication with a display located inside of the cab of the vehicle. However, the video alignment system does not aid in aligning a gooseneck or fifth wheel hitch of an applicable trailer to a gooseneck or fifth wheel hitch ball located on a truck bed.

The McCullough Patent (U.S. Pat. No. 5,650,764) discloses a trailer alignment device in which a visual display will indicate the space and distance from a hitch to a trailer. However, the trailer alignment device does not provide alignment means to a gooseneck or fifth wheel trailer hitch with respect to a gooseneck or fifth wheel trailer ball located on a floor of a truck bed.

The Thompson Patent (U.S. Pat. No. 7,195,267) discloses a video system for a vehicle in which a camera is mounted on the back of the truck and faces the hitch, and allowing the driver to properly align a hitch and a trailer. Again, the camera is located and aimed to the rear of the vehicle, and not focused on the truck bed working in conjunction with a sensor for aligning a gooseneck or fifth wheel hitch with a gooseneck or fifth wheel hitch ball.

The Dietz Patent Application Publication (U.S. Pub. No. 2010/0039515) discloses a system for facilitating the backing of a vehicle to couple a hitch and trailer, the system including one or more cameras providing visual images to the vehicle driver to assist in backing the vehicle and making the coupling. Again, the visual images are to a rear of the vehicle, and not on a gooseneck or fifth wheel hitch ball located on a floor of a truck bed.

The Trevino Patent Application Publication (U.S. Pub. No. 2008/0180526) discloses a camera in a towing vehicle module that provides the towing vehicle operator a video image of the trailer and a target mounted on it. Again, the camera works in close proximity of the hitch and ball to provide alignment, which is not located or directed to a truck bed for alignment of a gooseneck or fifth wheel-styled trailer.

The Sakuta Patent (U.S. Pat. No. Des. 312,649) illustrates an ornamental design for a video surveillance camera, which can be used anywhere on a truck.

While the above-described devices fulfill their respective and particular objects and requirements, they do not describe a reverse camera system for use with a pickup truck bed that works in conjunction with a proximity sensor to provide assistance in aligning a gooseneck of fifth wheel styled hitch ball located inside of a truck bed with an applicable gooseneck or fifth wheel trailer hitch; wherein the reverse camera system is centrally positioned on a $3^{rd}$ brake light and is directed downwardly into the truck bed in order to give visual display of the truck bed; wherein the reverse camera system may work in conjunction with an existing camera system of the truck, which may include a camera located on or around the tailgate and be of use up and until the gooseneck hitch is positioned inside of the truck bed whereupon the reverse camera system is used; wherein the proximity sensor detects the location of the gooseneck hitch inside of the truck bed, and provides different colored alarms in connection with the visual display of the reverse camera system in order to provide an alignment system for the gooseneck hitch of the gooseneck trailer with respect to the gooseneck hitch ball located in the truck bed. In this regard, the gooseneck trailer hitch alignment and safety system departs from the conventional concepts and designs of the prior art.

SUMMARY OF THE INVENTION

The gooseneck or fifth wheel trailer hitch alignment and safety system includes a reverse camera and at least one proximity sensor to provide alignment of a hitch to a hitch ball located inside of a truck bed. The reverse camera is positioned on or around a third brake light, and is aimed at the truck bed so as to provide visualization inside of the truck bed. The proximity sensor(s) detects the presence of a respective hitch located inside of the truck bed, and emits different colored alarms that in concert with the visualization of the reverse camera provide alignment means to a respective driver of said truck. The trailer hitch alignment system works in conjunction with either a gooseneck-styled trailer or a fifth wheel-styled trailer in order to provide alignment means to the driver.

An object of the invention is to provide an alignment system for use with gooseneck or fifth wheel-styled trailers that involve the use of a gooseneck hitch ball or fifth wheel coupling that are mounted on the bed of a pickup truck.

A further object of the invention is to provide a reverse camera that may work in conjunction with an existing rear view camera of the respective truck so as to provide multiple video feeds to be used when aligning the gooseneck hitch or fifth wheel hitch to the ball or coupling located inside of the truck bed.

A further object of the invention is to provide a reverse camera that aids the driver in aligning the hitch of the trailer once positioned inside of the truck bed where an existing rear view camera of the truck is no longer of use to the driver.

A further object of the invention is to provide at least one proximity sensor that is mounted onto an internal side surface of the truck bed, and which is able to detect the presence of the hitch once inside of the truck bed.

An even further object of the invention is to provide a series of colored alarms via the proximity sensor(s) that can be used via the driver to determine relative location of the hitch with respect to the ball or coupling.

An even further object of the invention is to provide the colored alarms in connection with the visual display of the reverse camera in order to provide an alignment system to the driver of the gooseneck or fifth wheel hitch to the hitch ball or coupling located on the truck bed.

These together with additional objects, features and advantages of the gooseneck trailer hitch alignment and safety system will be readily apparent to those of ordinary skill in the art upon reading the following detailed description of presently preferred, but nonetheless illustrative, embodiments of the gooseneck trailer hitch alignment and safety system when taken in conjunction with the accompanying drawings.

In this respect, before explaining the current embodiments of the gooseneck trailer hitch alignment and safety system in detail, it is to be understood that the gooseneck trailer hitch alignment and safety system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the gooseneck trailer hitch alignment and safety system.

It is therefore important that the claims be regarded as including such equivalent construction insofar as they do not depart from the spirit and scope of the gooseneck trailer hitch alignment and safety system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-12. A gooseneck or fifth wheel trailer hitch alignment and safety system 100 (hereinafter invention) includes a reverse camera 101 that is mounted on or adjacent to a third brake light 131 of a pickup truck 130. It shall be noted that the third brake light 131 is usually located on a top, rear edge 132A of a pickup truck cab 132, which is a highly visible location to motorists behind the pickup truck 130.

Figure 1:
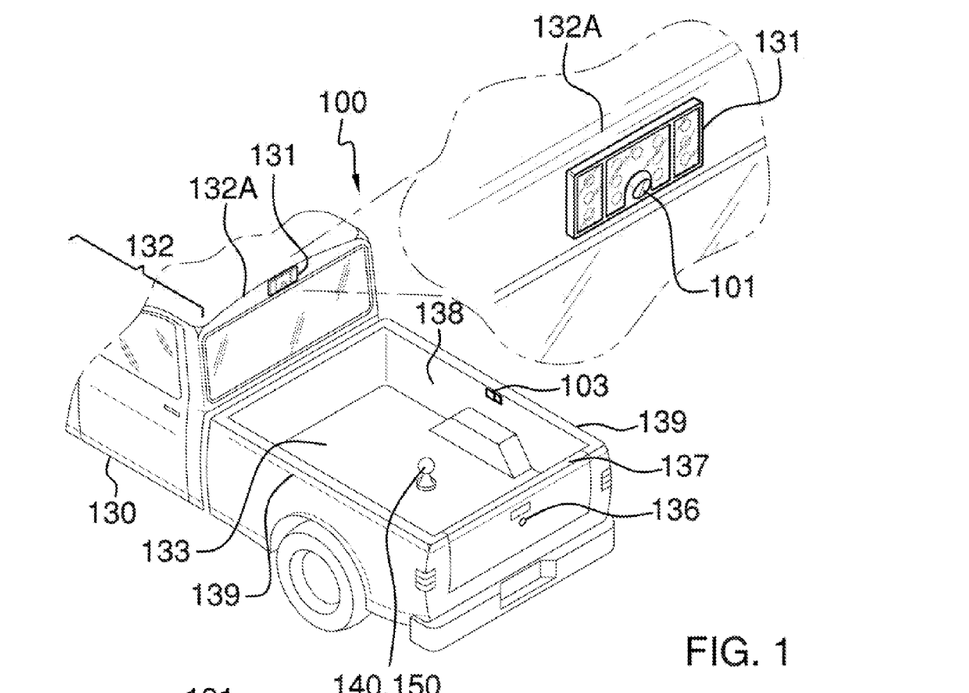
FIG. 1 illustrates a perspective view of a pickup truck having a gooseneck hitch ball located on a truck bed, and a further detail of the reverse camera located at the third brake light.
Figure 2:
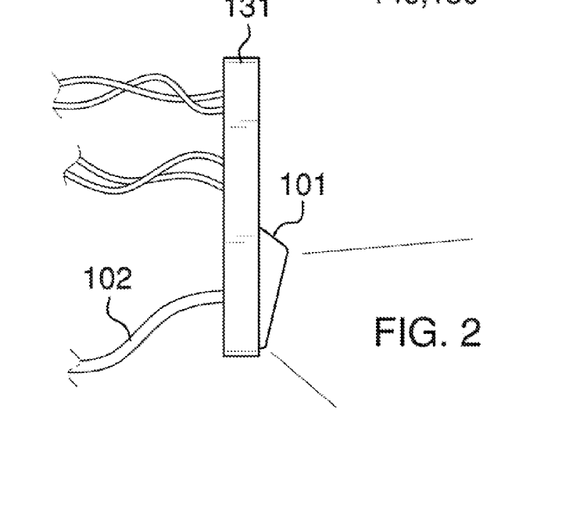
FIG. 2 illustrates a side view of the third brake light in which the reverse camera is directed downwardly in order to illustrate the aim of the reverse camera with respect to the truck bed.
Figure 3:
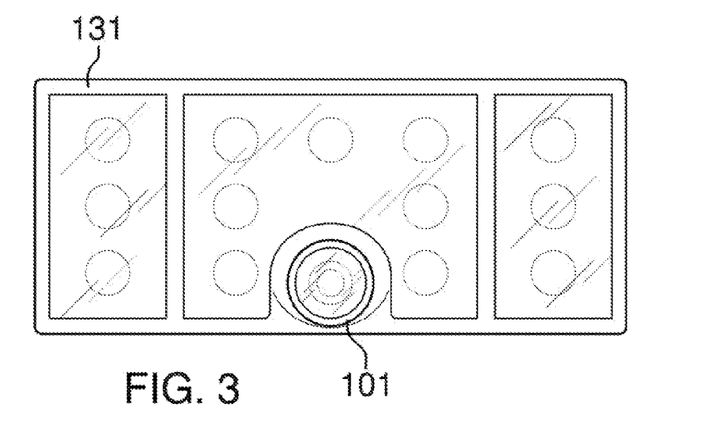
FIG. 3 illustrates a close up detail of the third brake light.
Figure 4:
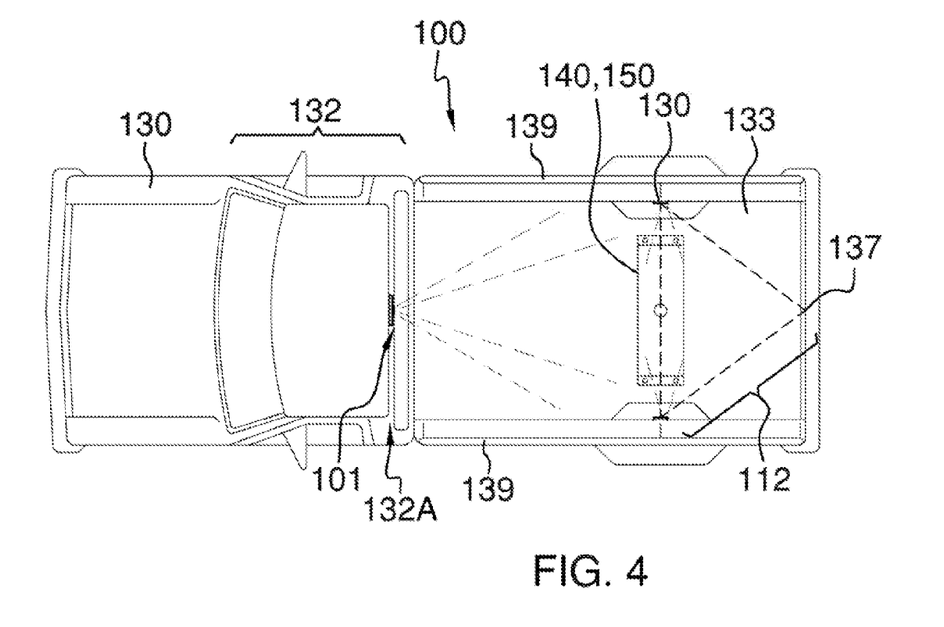
FIG. 4 illustrates a top view of the pickup truck in which the pickup truck bed includes a gooseneck hitch ball thereon, and sensors positioned on opposing internal side surfaces of the truck bed while further detailing the visual range of the reverse camera at the third brake light.

Referring to FIGS. 1-3, the third brake light 131 includes the reverse camera 101 within the construction, and positions and aims the reverse camera 101 downwardly and upon a truck bed of the pickup truck 130. The reverse camera 101 is in wired communication with a monitor 110 that is located inside of the pickup truck cab 132. The reverse camera 101 is connected to a reverse camera wire 102 that spans from the location of the reverse camera 101 to the monitor 110. Moreover, the monitor 110 is in view of a driver of the pickup truck 130. The monitor 110 may be an after-mark product that is installed onto a dashboard 134 of the pickup truck cab 132 or included with the pickup truck 130. That being said, it shall be hereby noted that pickup trucks 130 may include an existing rear view camera 136 that is in wired communication with the monitor 110 in order to provide video footage when driving the pickup truck 130 in reverse. The existing rear view camera 136 is usually located on a tailgate 137 of the pickup truck 130.

The invention 100 includes at least one proximity sensor that is positioned on an internal side surface 138 of the pickup truck 130. It shall be noted that the truck bed 133 is defined by the tailgate 137 and opposing sides 139. The opposing sides 139 each include the internal side surfaces 138, which face one another. The proximity sensor(s) 103 are positioned on the internal side surface 138, but adjacent to a gooseneck hitch ball 140 (see FIG. 7) or a fifth wheel coupling 150 (see FIG. 10). The proximity sensor(s) 103 are included with the invention 100 in order to detect and provide an alarm as to the location of a gooseneck hitch 141 (see FIG. 7) or a fifth wheel kingpin 151 (see FIG. 10). That being said, the gooseneck hitch 141 extends from a gooseneck trailer 142 whereas the fifth wheel kingpin 151 extends from a fifth wheel trailer 152. The invention 100 is designed to provide alignment of the gooseneck hitch 141 or fifth wheel kingpin 151 to the gooseneck hitch ball or the fifth wheel coupling 150, respectively. In either scenario, the invention 100 provides alignment of a trailer to a connection point located on the truck bed 133 of the pickup truck 130.

The proximity sensor(s) 103 is in wired communication with the monitor 110 and relays various signals that are in the form of colored alarms 111. The colored alarms 111 are used to indicate the location of the gooseneck hitch 141 or the fifth wheel kingpin 151 with respect to the gooseneck hitch ball 140 or the fifth wheel coupling 150 located on the pickup truck bed 133. Moreover, the monitor 110 shall include a triangularly-shaped zone 112 located on the video footage relayed from the reverse camera 101. The triangularly-shaped zone 112 correlates a spatial relationship of the gooseneck hitch 141 or the fifth wheel kingpin 151 with respect to the gooseneck hitch ball 140 or the fifth wheel coupling 150 in order to provide alignment thereto. Moreover, the triangularly-shaped zone 112, the various colored alarms 111, and the video footage from the reverse camera 101 provide a means of alignment of the gooseneck trailer 142 or the fifth wheel trailer 152 to the gooseneck hitch ball or the fifth wheel coupling 150, respectively.

It shall be noted that the various colored alarms 111 may be in the form of individual and uniquely colored circles 111A located on the monitor 110. One of the colored circles 111A may only be illuminated at a given time, and informs the driver of the pickup truck 130 where the gooseneck hitch 141 or the fifth wheel kingpin 151 is located with respect to the gooseneck hitch ball 140 or the fifth wheel coupling 150.

It shall be noted that the position of the tailgate 137 with respect to the use of the invention 100 is dependent on the type of trailer used and/or pickup truck 130. Moreover, the existing rear view camera 136 may operate up and until the reverse camera 101 and proximity sensor(s) 103 detect the gooseneck hitch 141 or the fifth wheel kingpin 151.

It shall be further noted that the monitor 110 may include a central processing unit 115 that processes the information produced from the reverse camera 101 as well as the proximity sensor(s) 103 in order to generate the colored alarms 111 and the triangularly-shaped zone 112 on the monitor 110.

Figure 5:
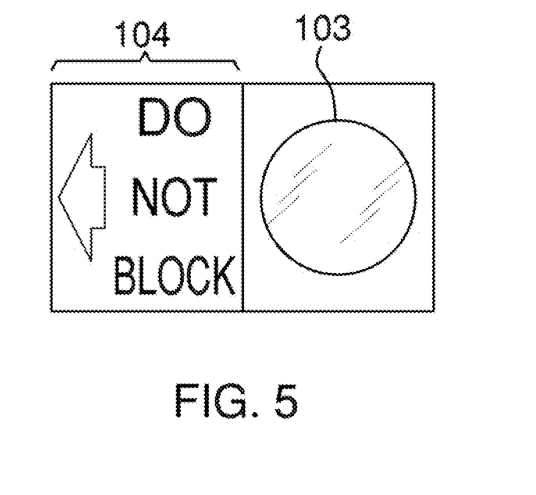
FIG. 5 illustrates a decal that may be used in and around the internal side surface of the pickup truck bed to warn against blocking of the proximity sensor.
Figure 6:
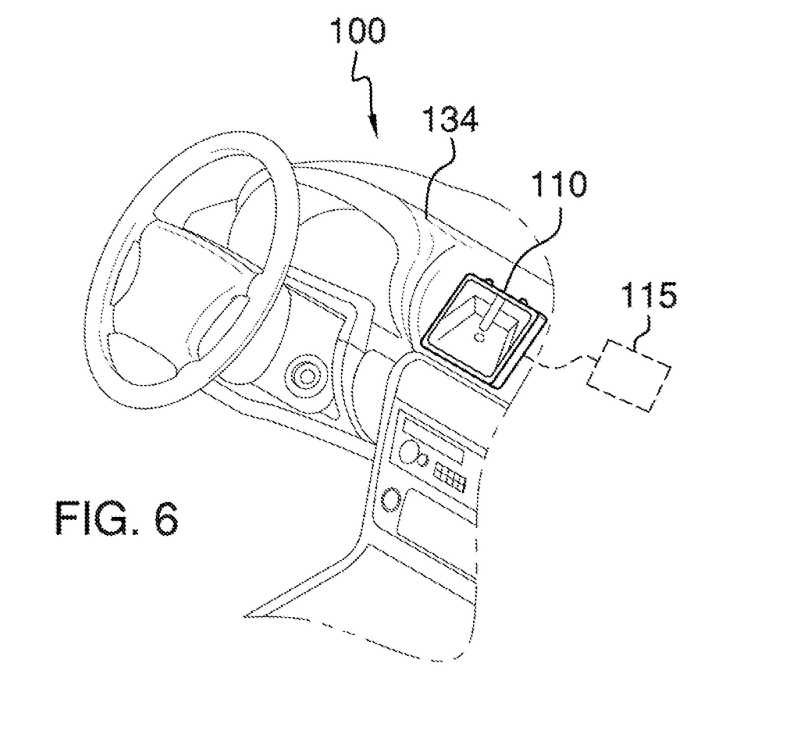
FIG. 6 illustrates a view of the monitor located inside of the cab of the pickup truck, which displays the output of the reverse camera.
Figure 7:
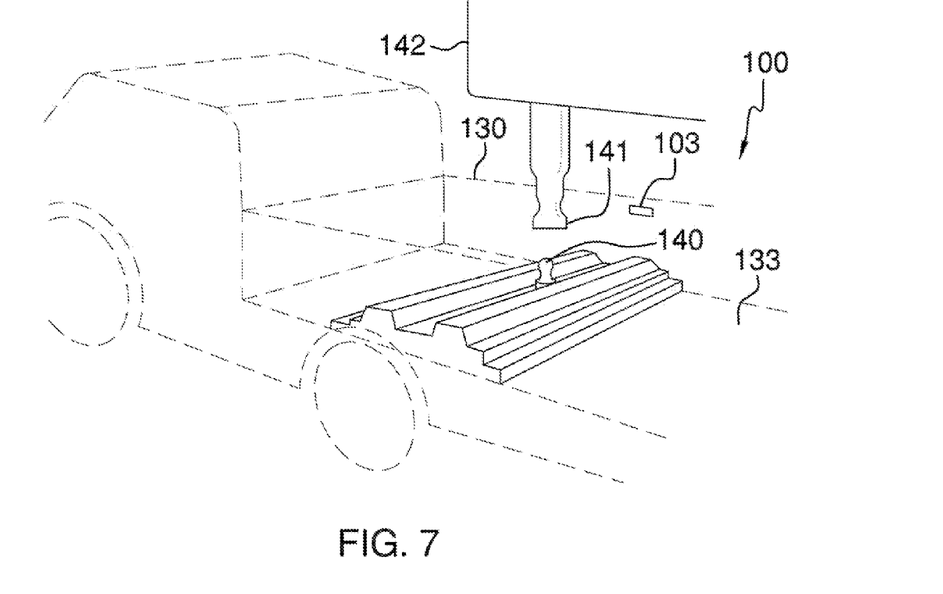
FIG. 7 illustrates a perspective view of a gooseneck trailer hitch being aligned above a gooseneck hitch ball mounted on a pickup truck bed.
Figure 8:
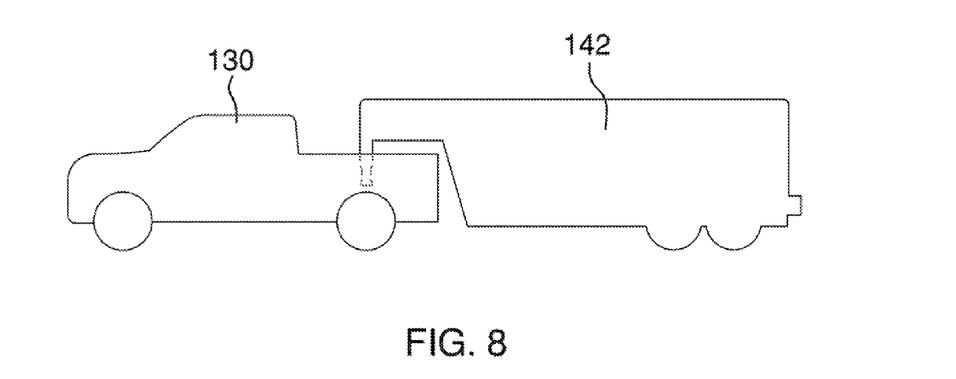
FIG. 8 illustrates a side view of the gooseneck trailer hitched to the respective pickup truck.
Figure 9:
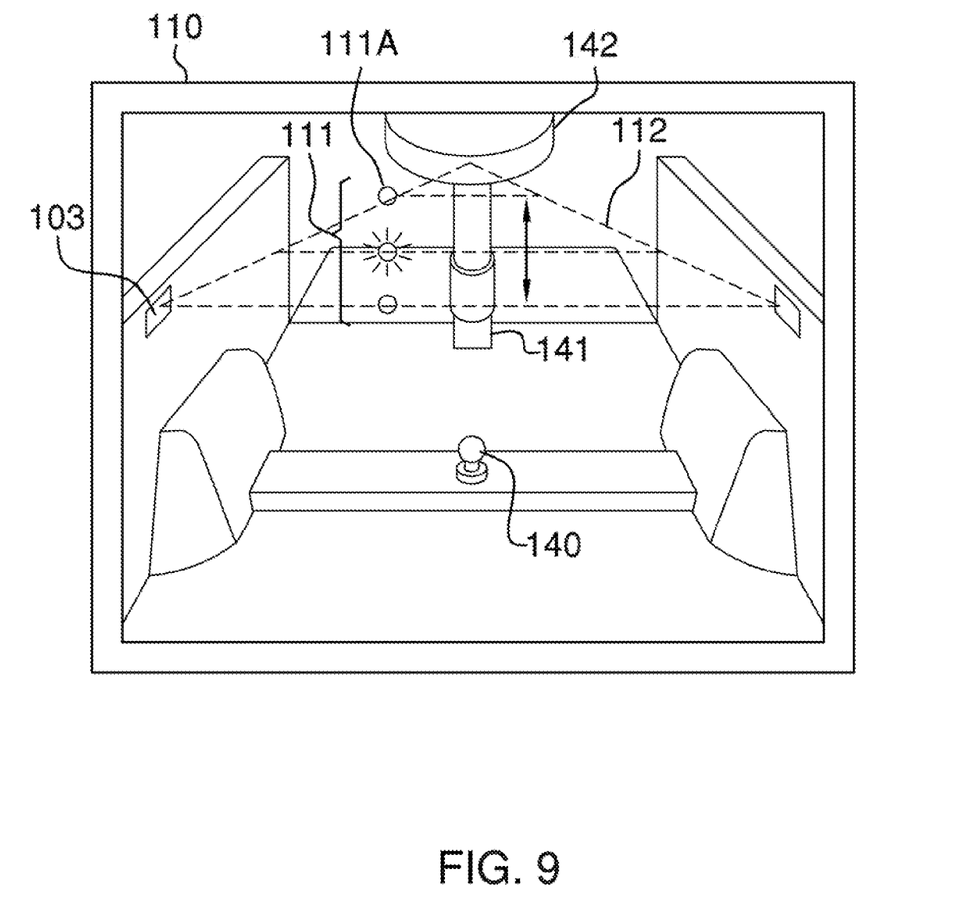
FIG. 9 illustrates a display with alignment of a gooseneck hitch with respect to a gooseneck hitch ball mounted on the truck bed, and wherein one of the colored alarms indicates the location of the gooseneck hitch with respect to the truck bed.
Figure 10:
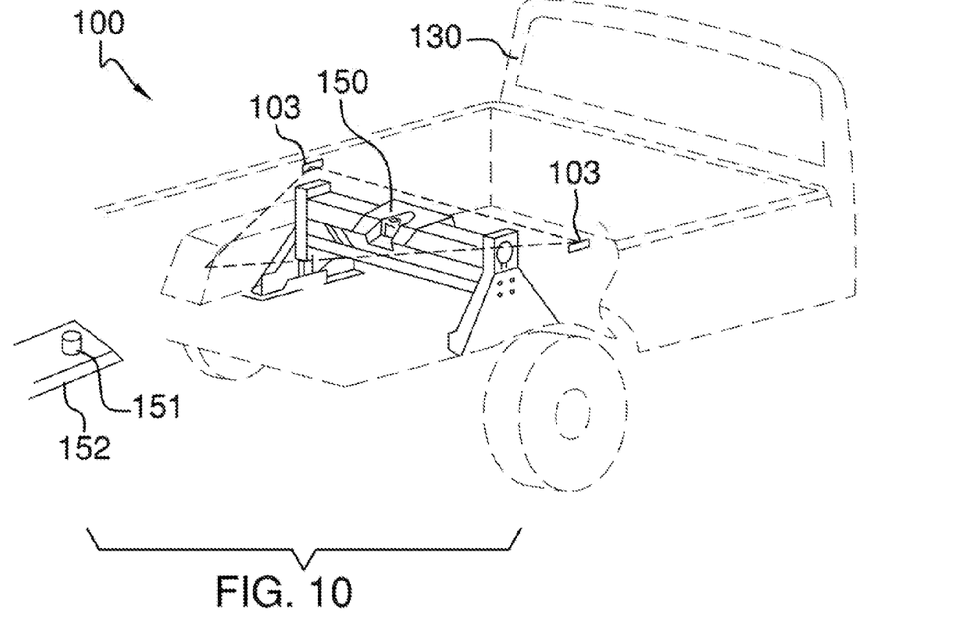
FIG. 10 illustrates a perspective view of the fifth wheel coupling mounted on a pickup truck bed.
Figure 11:
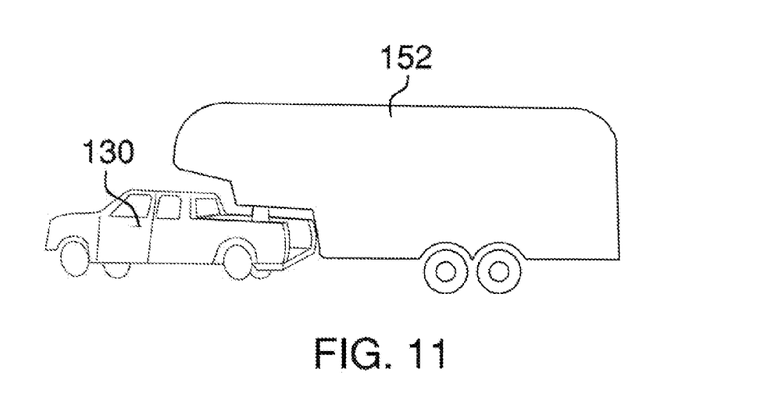
FIG. 11 illustrates a side view of a fifth wheel-styled trailer hitched to a pickup truck.
Figure 12:
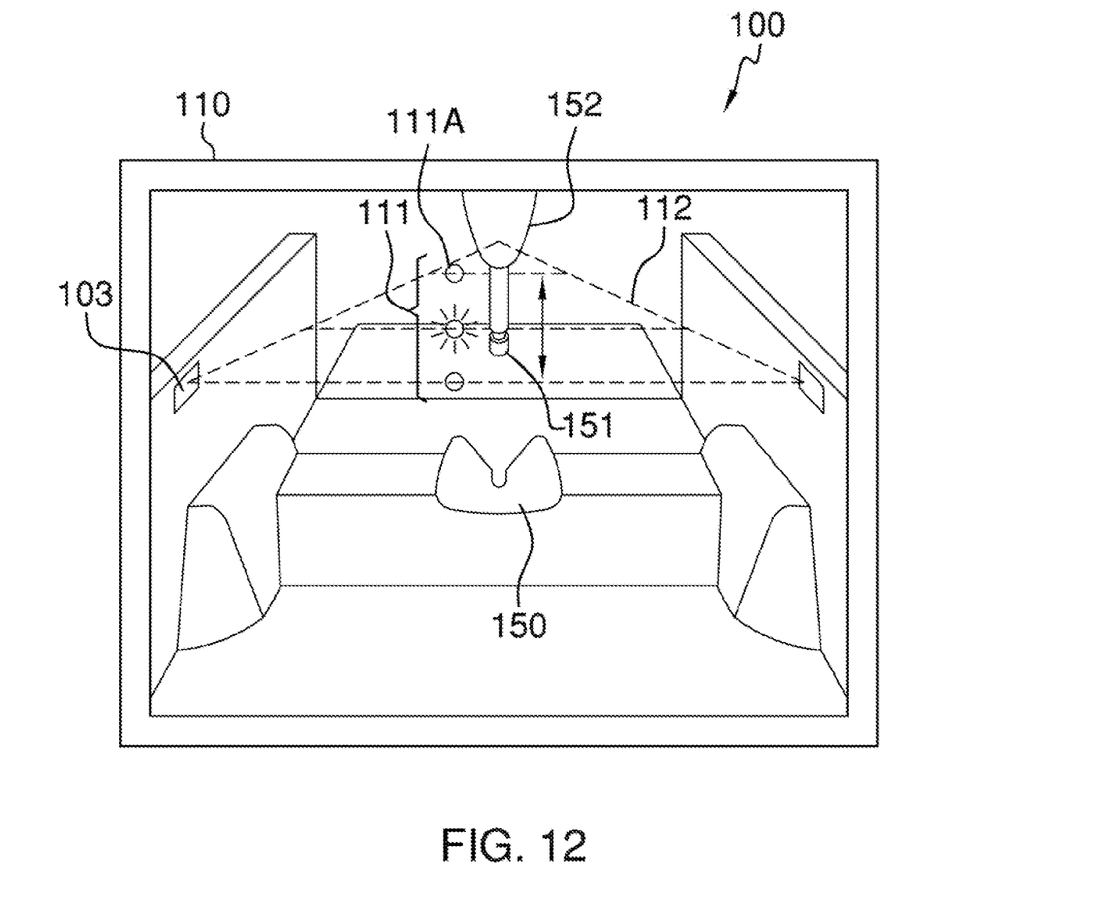
FIG. 12 illustrates a display with alignment of a fifth wheel coupling pin with respect to a fifth wheel coupling mounted on the truck bed, and wherein one of the colored alarms indicates the location of the coupling pin with respect to the truck bed.

Referring to FIG. 5, the invention 100 may include a decal that provides a warning not to block or otherwise obstruct the proximity sensor(s) 103.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gooseneck or fifth wheel trailer hitch alignment system comprising: a reverse camera positioned adjacent a top, rear edge of a pickup truck cab, and which is aimed downwardly at a truck bed so as to provide video footage to a monitor located inside of said truck cab and in view of a driver;

wherein at least one proximity sensor is located on an internal side surface of said truck bed, and which is able to detect the presence of a gooseneck hitch or fifth wheel kingpin inside of said truck bed, and which relays a series of colored alarms on said monitor to provide means of alignment of the gooseneck hitch or fifth wheel kingpin to a gooseneck hitch ball or fifth wheel coupling mounted on said truck bed;

wherein the reverse camera is mounted on or adjacent to a third brake light;

wherein the monitor produces a triangularly-shaped zone on the video footage of the reverse camera, and which works in conjunction with the colored alarms to provide alignment means on said monitor;

wherein the triangularly-shaped zone correlates a spatial relationship of the gooseneck hitch or the fifth wheel kingpin with respect to the gooseneck hitch ball or the fifth wheel coupling in order to provide alignment thereto;

wherein the colored alarms produced via the proximity sensor include a plurality of individual and uniquely colored circles located on the monitor;

wherein only one of the colored circles may be illuminated at a given time, and works in conjunction with the triangularly-shaped zone to provide spatial information for purposes of aligning the gooseneck hitch or fifth wheel kingpin with respect to the gooseneck hitch ball or the fifth wheel coupling, respectively.

* * * * *